United States Patent
Beers et al.

(10) Patent No.: US 7,994,261 B2
(45) Date of Patent: Aug. 9, 2011

(54) HIGHLY ELASTOMERIC AND PAINTABLE SILICONE COMPOSITIONS

(75) Inventors: Melvin Dale Beers, Aurora, OH (US); Ta-Min Feng, Hudson, OH (US); Steve S. Mishra, Pepper Pike, OH (US)

(73) Assignee: Tremco, Incorporated, Beachwood, OH (US)

( * ) Notice: Subject to any disclaimer, the term of this patent is extended or adjusted under 35 U.S.C. 154(b) by 505 days.

(21) Appl. No.: 12/044,050

(22) Filed: Mar. 7, 2008

(65) Prior Publication Data

US 2008/0312369 A1 Dec. 18, 2008

Related U.S. Application Data

(63) Continuation of application No. 10/874,512, filed on Jun. 23, 2004, now abandoned.

(51) Int. Cl.
*C08L 83/04* (2006.01)
*C09D 183/04* (2006.01)

(52) U.S. Cl. ........ 525/474; 525/100; 525/105; 525/446; 525/464; 525/477; 528/17; 528/18; 528/24; 528/34; 524/425; 524/430; 524/500; 524/506; 524/507; 524/588; 106/287.16

(58) Field of Classification Search .......................... None
See application file for complete search history.

(56) References Cited

U.S. PATENT DOCUMENTS

| | | | |
|---|---|---|---|
| 3,382,205 A | 5/1968 | Beers | |
| 3,441,534 A | 4/1969 | Knaub | |
| 3,627,722 A | 12/1971 | Seiter | |
| 3,632,557 A | 1/1972 | Brode et al. | |
| 3,957,714 A | 5/1976 | Clark et al. | |
| 3,979,344 A | 9/1976 | Bryant et al. | |
| 4,222,925 A | 9/1980 | Bryant et al. | |
| 4,247,445 A | 1/1981 | Smith, Jr. et al. | |
| 4,293,616 A | 10/1981 | Smith, Jr. et al. | |
| 4,345,053 A | 8/1982 | Rizk et al. | |
| 4,395,526 A | 7/1983 | White et al. | |
| 4,433,127 A | 2/1984 | Sugiyama et al. | |
| 4,496,696 A | 1/1985 | Kurita | |
| 4,546,017 A | 10/1985 | Flacket et al. | |
| 4,618,646 A | 10/1986 | Takago et al. | |
| 4,684,538 A | 8/1987 | Klemarczyk | |
| 4,902,767 A | 2/1990 | Roitman | |
| 4,931,485 A | 6/1990 | Inoue et al. | |
| 4,968,760 A | 11/1990 | Schiller et al. | |
| 5,091,445 A | 2/1992 | Revis | |
| 5,120,810 A | 6/1992 | Fujiki et al. | |
| 5,126,171 A | 6/1992 | Katsuno et al. | |
| 5,128,394 A | 7/1992 | Traver et al. | |
| 5,162,407 A | 11/1992 | Turner | |
| 5,326,845 A | 7/1994 | Linden | |
| 5,338,574 A | 8/1994 | O'Neil et al. | |
| 5,357,025 A | 10/1994 | Altes et al. | |
| 5,614,604 A | 3/1997 | Krafcik | |
| 5,714,563 A | 2/1998 | DePompei et al. | |
| 5,747,567 A | 5/1998 | Traver et al. | |
| 5,777,059 A | 7/1998 | Datz-Siegel et al. | |
| 5,840,800 A | 11/1998 | Joffre et al. | |
| 5,866,651 A | 2/1999 | Moren et al. | |
| 5,902,847 A | 5/1999 | Yanagi et al. | |
| 6,037,008 A | 3/2000 | Huang et al. | |
| 6,040,412 A | 3/2000 | Damme et al. | |
| 6,197,912 B1 | 3/2001 | Huang et al. | |
| 6,214,450 B1 | 4/2001 | Wickert et al. | |
| 6,294,620 B1 | 9/2001 | Huang et al. | |
| 6,306,999 B1 | 10/2001 | Ozai et al. | |
| 6,323,273 B1 | 11/2001 | Mahmud et al. | |
| 6,323,277 B1 | 11/2001 | Petty et al. | |
| 6,395,856 B1 | 5/2002 | Petty et al. | |
| 6,403,711 B1 | 6/2002 | Yang et al. | |
| 6,451,440 B2 | 9/2002 | Atwood et al. | |
| 6,545,104 B1 | 4/2003 | Mueller et al. | |
| 6,552,118 B2 | 4/2003 | Fujita et al. | |
| 6,602,964 B2 | 8/2003 | Huang et al. | |
| 6,759,094 B2 | 7/2004 | Herzig et al. | |
| 6,780,926 B2 | 8/2004 | Leempoel et al. | |
| 2004/0082735 A1 | 4/2004 | Yeats et al. | |

FOREIGN PATENT DOCUMENTS

| | | |
|---|---|---|
| EP | 0604815 | 7/1994 |
| EP | 0604851 | 7/1994 |
| EP | 0641829 A2 | 3/1995 |
| EP | 0731143 | 9/1996 |
| EP | 0816437 | 1/1998 |
| EP | 1063270 | 12/2000 |
| EP | 1153084 | 9/2002 |
| EP | 00229490 | 8/2008 |
| JP | 6121158 | 1/1986 |
| JP | 62135560 | 6/1987 |
| JP | 1282262 | 11/1989 |
| JP | 03210367 | 9/1991 |
| JP | 493359 | 3/1992 |

(Continued)

OTHER PUBLICATIONS

Silicones and Industry, A Compendium for Practical Use, Instruction, and Reference authored by Tomanek and published by Hanser.*
Supplementary European Search Report from Application No. 05763693.8 dated Jan. 21, 2010, 3 pages.
Beers, M. Dale, et al., "Silicones," ASM Int'l Engineered Materials Handbook, 1990, pp. 215-221, vol. 3.
Derwent patent search results (18) for "general electric and silicone and paint," Jul. 9, 2001, http://ww.delphion.com/cgi-bin/patsearch.
MicroPatent patent search results (13) for "silicone and paint and general electric, EP, WO, JP, 1995-2001," Jul. 9, 2001, http://www.micropat.com/cgi-bin/psssearch.
MicroPatent patent search results (39) for "paint and silicone and general electric, US, EP, WO, JP, 1995-2001," Jul. 9, 2001, http://www.micropat.com/cgi-bin/psssearch.
MicroPatent patent search results (61) for "silic* and paint* and general electric, EP, WO, JP, 1995-2001," Jul. 9, 2001, http://www.micropat.com/cgi-bin/pslist.

(Continued)

*Primary Examiner* — Marc Zimmer
(74) *Attorney, Agent, or Firm* — Calfee, Halter & Griswold LLP

(57) ABSTRACT

Highly elastomeric, curable, paintable silicone compositions are provided. The paintable silicone compositions comprise an organopolysiloxane, a silicone functional crosslinker, and an organic polymer. The highly elastomeric, curable, paintable silicone compositions have an elongation of at least 150% and are useful as paintable sealants and caulks.

26 Claims, No Drawings

FOREIGN PATENT DOCUMENTS

| | | |
|---|---|---|
| JP | 6228401 | 8/1994 |
| JP | 06256620 | 9/1994 |
| JP | 1067940 | 3/1998 |
| JP | 10168299 | 6/1998 |
| JP | 2000336310 | 5/2000 |
| JP | 2002536526 | 10/2002 |
| JP | 2003268229 | 9/2003 |
| WO | 200047680 | 8/2000 |
| WO | 2005087865 | 9/2005 |
| WO | 2006002425 | 1/2006 |

OTHER PUBLICATIONS

MicroPatent patent search results (1 JP Abstract) for "solventless primer composition and general electric, EP, WO, JP, 1995-2001," Jul. 9, 2001, http://www.micropat.com/cgi-bin/pslist.

Concept Queery patent search results (25) for "The present invention pertains to moisture curable sealant compositions based on alkoxysilane . . . , US, Jan. 1, 1971-Mar. 27, 2001," http://mapit.mnis.net/LIVE/pl/mapit,cgi.

Page 2, Giving Examiner's statement of reasons for allowance in Notice of Allowance in commonly assigned U.S. Appl. No. 11/138,730.

International Search Report and Written Opinion from PCT/US05/22782 mailed Oct. 20, 2006.
Office action from U.S. Appl. No. 10/874,512, mailed Aug. 5, 2006.
Amendment from U.S. Appl. No. 10/874,512, mailed Dec. 5, 2006.
Office action from U.S. Appl. No. 10/874,512, mailed Mar. 7, 2007.
Amendment from U.S. Appl. No. 10/874,512, mailed Aug. 10, 2007.
Supplemental Amendment from U.S. Appl. No. 10/874,512, submitted Oct. 25, 2007.
Notice of Allowance from U.S. Appl. No. 10/874,512, mailed Nov. 13, 2007.
Comments on Statement of Reasons for Allowance from U.S. Appl. No. 10/874,512, mailed Nov. 29, 2007.
Office action from U.S. Appl. No. 11/138,730 mailed Jan. 25, 2008.
Amendment from U.S. Appl. No. 11/138,730 dated Feb. 22, 2008.
Office action from U.S. Appl. No. 11/138,730 mailed Oct. 7, 2008.
Notice of Allowance from U.S. Appl. No. 11/138,730 mailed Jun. 2, 2008.
European Search Report from Application No. 05763693.8 dated Aug. 30, 2010, 3 pages.
Notice of Reason for Rejection from Japanese Patent Application No. 2007-518353 dated Feb. 22, 2011.

* cited by examiner

HIGHLY ELASTOMERIC AND PAINTABLE SILICONE COMPOSITIONS

This application is a continuation of parent application Ser. No. 10/874,512, the disclosure of which is incorporated herein by reference and the priority for which is hereby claimed.

FIELD OF THE INVENTION

The present invention relates to a unique family of one and two component highly elastomeric vulcanizable paintable silicone sealants and extrusions exhibiting high elongation characteristics combined with excellent adhesion and weathering resistance. They can be designed to have a wide range of properties ranging from low modulus to high strength self-adhering curable room temperature vulcanizable (RTV) silicone compositions exhibiting superior paintability and adhesion characteristics while maintaining the outstanding weathering resistance of silicone elastomers.

BACKGROUND OF THE INVENTION

Silicone compositions are widely used in the construction industry as well as other industrial applications, such as automotive, electronics, aerospace and consumer markets because these materials possess self-bonding adhesion properties to several types of substrates such as glass, metal, ceramics, fabrics, wood, leather, plastics and paper. In addition, superior properties such as low temperature flexibility, high-temperature stability, good electrical insulation and resistance to chemicals and UV resistance are inherent in silicone-based products. Thus, silicone extrusions are widely used in a variety of applications. A disadvantage of cured silicone compositions, however, is that they are considered to be unpaintable. The low surface energy of the silicone prevents latex or oil based paints to wet the surface of the cured silicone. The paint tend to shrink away from the silicone surface leaving a poor surface appearance commonly referred to in the industry as "fish eyes."

Attempts to improve paintability of silicone compounds have been made by adding inorganic fillers to the uncured silicone. For example, silicone sealants have been formulated with the addition of acicular, i.e. needle-like, calcium carbonate to the polyorganosiloxane. In such sealants, the acicular particles become oriented on the surface of the sealant during curing. The surface of the cured sealant has improved paintability, but the addition of the acicular calcium carbonate results in other problems such as low elasticity. The generally high loading of calcium carbonate necessary to achieve improved paintability deleteriously affects the elasticity of the silicone sealant such that its tensile elongation is lower than desired.

Plasticizer can be added to counter the negative effect of calcium carbonate on the extensibility of the silicone. However, plasticizers detract from the paintability of the silicone sealant.

It is desirable to provide a curable silicone composition that, once cured, is paintable by many types of coatings. It is also desirable to provide silicone extrusions, sealants, adhesives, and caulks that are paintable over an extended period of time and which maintain the excellent elastomeric and other properties inherent in silicone.

SUMMARY OF THE INVENTION

The organopolysiloxane compositions of the present invention comprise an organic polymer, an organic oligomer, or combinations of an organic polymer and an organic oligomer; an organopolysiloxane polymer; and a crosslinker. The compositions may further comprise other additives to modify the properties of the organopolysiloxanes. The organic polymer can be a homopolymer, a copolymer and mixtures thereof having reactive or non-reactive terminal groups. It has been discovered that such compositions, when cured, produce a silicone sealant that exhibits excellent paintability and superior weathering properties.

The silicone compositions of the present invention, once cured, can be painted without the formation of "fish eyes" on the painted surface, and has an elongation of at least 150%. The elongation of the cured silicone composition may be 200% or greater, 800% or greater, or even 1000% or greater.

The curable silicone compositions of the present invention generally contain from about 50% to about 95% (by weight, based on total polymer) organopolysiloxane polymer; from about 1% to about 10% (by weight, based on organopolysiloxane) silicone functional crosslinker; and from about 5% to about 50% (by weight, based on total polymer) dispersed organic polymer. Preferably, the curable silicone compositions comprise from 55% to 93% by weight organopolysiloxane polymer. More preferably, the curable silicone compositions comprise from 57% to 91% by weight organopolysiloxane polymer.

Preferably, the curable silicone compositions of the present invention comprise from 7% to 45% by weight organic polymer. More preferably, the curable silicone compositions comprise from 9% to 43% by weight organic polymer.

The organopolysiloxane polymers preferably have at least two reactive functional groups on the polymer chain. The reactive functional groups may be from hydroxyl, alkoxy, silicone alkoxy, acyloxy, ketoximo, amino, amido, aminoxy, alkenoxy, alkenyl, enoxy and mixtures thereof. The reactive functional groups are end groups, pendant groups, or a combination thereof.

The organic polymer used in the curable silicone compositions of the present invention may be selected silylated and non-silylated polyurethanes, silylated allylic terminated polyethers, polyethers containing one or more silicone functional groups, silylated and non-silylated acrylic functional polymers, silylated and non-silylated butyl functional polymers, and copolymers and mixtures thereof.

The amount of organic polymer used in preparing the paintable, curable silicone compositions of the present invention depends on the organic polymer used. The organic polymer is added by weight, based on total polymer, and ranges from about 15% to about 50% for silylated and non-silylated polyurethane; from about 15% to about 50% for silylated allylic terminated polyether; from about 15% to about 50% silylated allylic terminated acrylic polyether; from about 15% to about 50% for polyether having a silicone functional group; from about 10% to about 50% for silylated and non-silylated acrylic multipolymer; and from about 5% to about 50% for silylated and non-silylated butyl functional polymer.

The organopolysiloxane used in the present invention preferably has a molecular weight in the range from 20,000 to 100,000 grams/mole. The organopolysiloxane has at least two reactive groups and an organic polymer selected from the group consisting of silylated polyurethane, non-silylated polyurethane, silylated allylic terminated polyether, a polyether that contains a silicone functional group, a silylated acrylic functional polymer, a non-silylated acrylic functional polymer, a silylated butyl functional polymer, a non-silylated butyl functional polymer, and mixtures thereof. The reactive groups may be selected from end groups, pendant groups, and combinations thereof.

The silicone crosslinker used in the paintable, curable silicone compositions of the present invention may be selected from such crosslinkers as oximes, alkoxysilanes, epoxyalkylalkoxysilanes, amido silanes, aminosilanes, enoxysilanes, tetraethoxysilanes, methyltrimethoxysilane, vinyltrimethoxysilane, glycidoxypropyltrimethoxsilane, vinyltris-isopropenoxysilane, methyltris-isopropenoxysilane, methyltris-cyclohexylaminosilane, methyltris-secondarybutylaminosilane, condensation cure catalysts, and combinations thereof. Preferred oxime crosslinkers include vinyltrismethylethylketoximosilane, methyltrismethylethylketoximosilane, and combinations thereof.

In accordance with the present invention, the paintable, curable silicone compositions may be 1-part curable compositions or 2-part curable compositions. The paintable, curable silicone composition may be either thermally curing systems and room temperature curing systems. The paintable, curable silicone may be an extrusion or in situ cured systems.

The paintable, curable silicone compositions of the present invention may further comprise from about 0.01% to about 2% (by total weight) catalyst. Suitable catalysts include metal salts of carboxylic acids, organotitanates, platinum complexes, peroxides, and combinations thereof. Preferred catalysts comprising metal salts of carboxylic acids include dibutyltindilaurate, dibutyltindiacetate, dimethyltindi-2-ethylhexanoate, and combinations thereof. Preferred organotitanates include tetrabutyltitanate, tetra-n-propyltitanate, diisopropoxydi(ethoxyacetoacetyl)titanate, bis(acetylacetonyl)diisopropyl titanate and combinations thereof.

The paintable, curable silicone composition may further include from about 3% to about 60% (by total weight) reinforcement agents, semi-reinforcing agents, or combinations thereof. Some preferred reinforcement agents include hydrophobic treated fumed silicas, untreated fumed silicas, hydrophobic precipitated calcium carbonates, ground calcium carbonates, talc, zinc oxides, polyvinyl chloride powders, soft acrylic polymers and combinations thereof. The paintable, curable silicone compostions may further comprise from about 0.5% to about 2% (by total weight) adhesion promoter.

A preferred organic polymer used in the paintable, curable silicone compositions is a silylated polyurethane polymer. This silylated polyurethane polymer may be derived by the steps of a) reacting a diisocyanate compound with a polyol to form an intermediate, wherein the intermediate is selected from isocyantates or hydroxyl terminated polyurethane prepolymers; and b) silylating the intermediate. Preferably, the intermediate is silylated with an organo functional silane having one or more hydrolyzable groups. Some preferred hydrolyzable groups include $(OCH_3)_3$, $(OCH_2CH_3)_3$, oximo, enoxy, isopropenoxy,

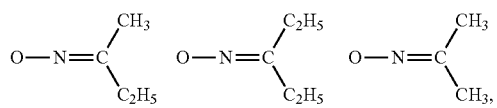

and combinations thereof.

Preferably, the organo functional silane is of the formula:

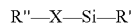

wherein R' is selected from the group consisting of $(OCH_3)_3$, $(OCH_2CH_3)_3$, $CH_3(OCH_3)_2$, or $CH_3(OCH_2CH_3)_2$, other hydrolyzable groups such as oximo substituents, enoxy, and isopropenoxy; R" is selected from the group consisting of amino, ureido, mercapto, isocyanato, and epoxy; and X is $C_1$ to $C_8$. The molecular weight of the polyurethane prepolymer intermediate ranges from 5,000 to 50,000 g/mol. The polyurethane prepolymer intermediate has a NCO:OH ratio in the range from 1.4:1 to 3:1 or an OH:NCO ratio in the range from 1.4:1 to 3:1.

The organic polymer may also be silylated allylic terminated polyether; wherein the silylated allylic terminated polyether is derived from the reaction of a vinyl alkyl terminated polyol with a hydride functional silane. Preferably, the hydride functional silane is selected from the group consisting of triethoxysilane, trimethoxysilane, methyldiethoxysilane, methyldimethylsilane and combinations thereof.

The organic polymer may also be a polyether having a silicone functional group. Preferably, when the organic polymer is a polyether having a silicone functional group, the silicone functional group is a hydrolyzable silane group. Preferable polyethers having a silicone functional group are those having a molecular weight in the range from about 2,000 to about 50,000 g/mole.

The present invention also relates to the methods of making such curable silicone sealant compositions.

DETAILED DESCRIPTION OF THE INVENTION

The organopolysiloxane compositions of the present invention are comprised of a reactive organopolysiloxane polymer, a polymer phase comprising an organic polymer/oligomer having limited compatibility with the reactive organopolysiloxane polymer and a silicone functional cross-linking system. The organic polymer/oligomer phase may contain reactive organosilyl terminal groups which can enter into a vulcanization reaction with the silicone functional crosslinking system attached to the reactive organopolysiloxane polymer. To maintain the superior weathering resistance of typical elastomeric silicones and excellent paintability unlike normal silicone elastomers, the concentration of the organic polymer/oligomer must be maintained within precise ranges. Both elevated and depressed levels of the organic polymer/oligomer phase will cause a loss of good paintability. The outstanding weathering resistance of these compositions has been demonstrated by the lack of surface degradation after more than 20,000 hours exposure in a Xenon Arc Weatherometer as discussed below. The compositions of the present invention may be painted by a variety of paints, even after curing for several weeks while maintaining the excellent elastomeric properties inherent in silicone.

As used herein, the phrase "semi-compatible organic polymer/oligomer" encompasses organic polymers and oligomers that are not fully compatible with the organopolysiloxanes used in the present invention, i.e., the semi-compatible organic polymers/oligomers are not fully miscible with the organopolysiloxanes of the present invention.

The paintable silicone composition of the present invention is generally made by blending a semi-compatible organic polymer/oligomer, a cross-linker, and other additives generally used in silicone sealants and extrusions in the presence of a reactive polysiloxane fluid.

The curable organopolysiloxane composition of the present invention comprises a reactive organopolysiloxane polymer, a semi-compatible organic polymer/oligomer, a crosslinker, and optionally may include an adhesion promoter, a reinforcement agent, a rheology modifier, a chain extender, and so forth. Once the composition is reacted, the resulting silicone sealant is paintable even after having been cured for a prolonged period.

The curable organopolysiloxane composition comprises by weight from about 5% to about 50%, preferably from about 7% to about 45%, and even more preferably from about 9% to about 43% organic polymer/oligomer, from about 50% to about 95%, preferably from about 55% to about 93%, even more preferably from about 57% to about 91% organopolysiloxane polymer. When cured, the paintable silicone composition has an elongation of at least 150%, and up to 200%, 400%, and even greater than 800%. The paintable silicone compositions described herein have been shown to have elongations of greater than 1000%.

The polyorganosiloxane generally contains at least two reactive functional groups on the polymer chain, preferably at the terminal portion thereof, i.e., preferably the reactive functional groups are end-groups. The polyorgansiloxanes useful in this invention are those which contain a condensable functional group which can be an hydroxyl group, or hydrolyzable group such as a silicon-bonded alkoxy group, acyloxy group, ketoximo group, amino group, amido group, aminoxy group, an alkenoxy group, and so forth.

The organopolysiloxane polymer is of the formula:

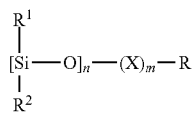

where $R^1$ and $R^2$, independently, are an alkyl having from 1 to 8 carbon atoms, desirably from 1 to 4 carbon atoms with methyl being preferred, or is an aromatic group or substituted aromatic group having from 6 to 10 carbon atoms with phenyl being preferred, and "n" is such that the weight average molecular weight of the organopolysiloxane is from about 10,000 to about 200,000 and desirably from about 20,000 to about 100,000 grams/mole. It is to be understood that the above polymers also contain, as noted above, two or more reactive functional groups (X) therein. The functional groups, independently, can be OH, or $OR^3$, or $N(R^4)_2$, enoxy, acyloxy, oximo, or aminoxy, wherein these functional groups may have substituents at any substitutable location. For example,

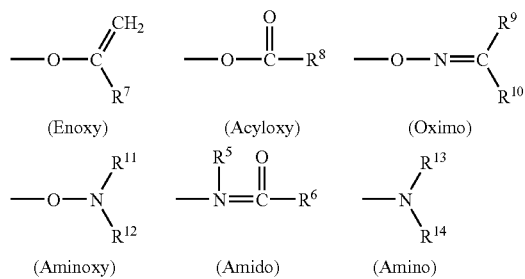

wherein $R^3$ through $R^{14}$ are, independently, an alkyl or cycloalkyl having from about 1 to about 8 carbon atoms.

The organopolysiloxane of the present invention may be depicted as

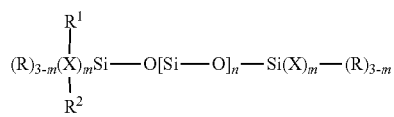

The one or more R groups, independently, is an alkyl having from 1 to 8 carbon atoms or an aromatic or an alkyl-aromatic having from 6 to 20 carbon atoms and optionally containing one or more functional groups thereon, such as amine, hydroxyl, alkene, alkoxy, and so forth. The amount of the functional groups, i.e., m, is 1, 2 or 3.

The reactive functional group (X), can be OH, or OR', or N(R'), or enoxy, or acyloxy, or oximo, or aminoxy, or amido, wherein the reactive functional group may have substitutions, R', at any substitutable C or N, and which is selected from the group consisting of an alkyl having from about 1 to about 8 carbon atoms, an aromatic, an alkyl-aromatic having from 6 to 20 carbon atoms, and wherein R' may optionally contain one or more functional groups thereon such as amine, hydroxyl, and so forth. An organopolysiloxane fluid can furthermore contain a blend of two or more different polysiloxanes and/or organopolysiloxanes having different molecular weights. The polysiloxanes are generally a viscous liquid and are commercially available from several silicone manufacturers such as Wacker Corporation, General Electric, Dow Corning and Rhone-Poulenc.

The paintable sealant compositions of the present invention are cured by generally subjecting them to moisture or a curative. Either a conventional one-component or two-component cure system can be utilized. In a conventional one-component cure, the organopolysiloxane is converted to a compound having an alkoxy, an oxime, an enoxy, an amido, an amino, or an acetoxy blocking group in a manner well known to the art and to the literature. Conventional condensation catalysts may be utilized, such as an organotin, for example, dibutyltindilaurate, dibutyltindiacetate, dimethyltindi-2-ethylhexanoate, or dimethylhydroxytinoleate, or an organotitanate.

The semi-compatible organic polymers/oligomers used in accordance with the present invention are generally organic polymers included in any of a variety of well known polymers having non-reactive or reactive functional groups, or polymers with no functional groups, and which can be intermixed with reactive organopolysiloxane polymer. The organic polymer can be a homopolymer, a copolymer or mixtures thereof and the polymer can be a crosslinking or a non-crosslinking polymer. Organic polymers include aromatic and aliphatic polyurethanes, polyurea, polyether, polyester, acrylic, polystyrene, styrene butadiene, polybutadiene, butyl rubber, with or without other organo functional groups attached to then, and mixtures thereof. Aromatic and aliphatic polyurethanes may have different backbones such as polyester, polyether, polyacrylate, polybutadiene, polycarbonate, and so forth, or a combination thereof. Furthermore, they could also have other functional groups, such as acrylates, amides, maleic anhydride, and so forth.

Another suitable organic polymer is a reactive silylated aromatic or aliphatic polyurethane polymer from the above general polyurethane category. Polyurethane prepolymers whose terminal ends are partially, or fully, end-capped with either silane groups or with a combination of silane groups and end capping groups that have been derived from one or more aromatic alcohols, or one or more aliphatic alcohols, or a combination of one or more aromatic alcohols and one or more aliphatic alcohols.

Examples of suitable silanes corresponding to the above-mentioned system include N-phenylaminopropyltrimethoxysilane, N-ethylaminoisobutyltrimethoxysilane, γ-aminopropyltrimethoxysilane, γ-aminopropyltriethoxysilane, and the reaction product of an aminosilane (such as γ-aminopropyltrimethoxysilane, γ-aminopropyltriexthoxysilane, γ-aminopropylmethyldimethoxysilane) with an acrylic monomer (such as ethyl acrylate, 2-ethylhexyl acrylate, methyl acrylate, methyl methacrylate, and glycidal acrylate), mercaptosilane, the reaction product of a mercaptosilane with a monoepoxide, the reaction product of an epoxysilane with a secondary amine, isocyanato propyl triethoxy silane, and ureido propyl trimethoxy silane.

In another embodiment of the invention the organic polymer is a silylated allylic terminated linear or branched polyether. The polyether backbone may have other functional groups, such as acrylates, amides, maleic anhydride, and so forth. The polymers' terminal ends could be partially or fully end-capped either with silane groups or with a combination of silane groups and other end-capping groups.

Another suitable class of organic polymer/oligomers are reactive silylated polyols, i.e., reactive polyol polymers or oligomers which have been silylated. These polyols may be selected from polyester, polyether, polyacrylate, polybutadiene, polycarbonate, and so forth. The silylation may be done as discussed above. See, Paragraph [0018], especially in connection with its discussion of silylating hydroxyl terminated polyurethane prepolymers.

Optionally, the blocked one-component cure system can contain crosslinking agents as set forth herein. In a two-component cure system, crosslinking agents, such as a multifunctional alkoxy silane or oligomers thereof and catalysts are kept separate from the organopolysiloxane until reaction. The amount of catalyst for the two-component system is generally higher than in the one-component system. Such cure systems are well known to the art, see, e.g., Maurice Morton, et al., *Rubber Technology*, 3rd Ed., pp. 406-407, (1987), which is hereby fully incorporated by reference. When a two part cure is used, the two-part cure may either be a room-temperature curable or a thermally curing material.

While a variety of conventional crosslinkers are suitable, oxime and alkoxy crosslinkers are preferred, such as, for example, vinyltris-methylethylketoximosilane, and methyltris-methylethylketoximosilane, and alkoxysilanes such as methyltrimethoxysilane and vinyltrimethoxysilane. Methyltrimethoxysilane is available, for example, under the trade name A-1630 and vinyltrimethoxysilane is available, for example, under the trade name A-171 from General Electric-OSI Specialties. Methyltris-methylethylketoximosilane (MOS) is available under the trade name OS-1000, for example, and vinyl tris-methylketoximosilane under the trade name of OS-2000 by Honeywell Corporation, for example. Other crosslinkers are also suitable, such as alkoxysilanes, epoxyalkylalkoxysilanes, amidosilanes, aminosilanes, enoxysilanes and the like, as well as tetraethoxysilanes, glycidoxypropyltrimethoxsilane, vinyltris-isopropenoxysilane, methyltris-isopropenoxysilane, methyltriscyclohexylaminosilane, and methyltrissecondarybutylaminosilane. Mixtures of crosslinkers may also be employed. The amount of the crosslinking agent is generally from about 0.2 to about 20 parts by weight, desirably from about 1 to about 10 parts by weight, and preferably from about 1.5 to about 6.5 parts by weight for every 100 parts by weight of said copolymer-organopolysiloxane. Addition cure crosslinkers may also be used in conjunction with alkenyl functional organopolysiloxane polymers. These crosslinkers may be pre-reacted to the polyorganosilane polymers.

The crosslinker is used in amounts which are conventionally used for making curable silicone elastomeric compositions. Those skilled in the art may determine the proper amounts for room-temperature curable and thermally curable crosslinkers. The amounts used will vary depending upon the particular crosslinker chosen and the properties of the cured elastomer desired, and may readily be determined by those of ordinary skill in the art.

A mixture of polyorganosiloxane and crosslinker will usually cure at room temperature when exposed to moisture, however, sometimes it is desirable to accelerate the cure rate, i.e., reduce the time to cure composition. In these situations a catalyst may be used. Preferred catalysts include metal salts of carboxylic acids such as dibutyltindilaurate, dibutyltindiacetate, and dimethyltindi-2-ethylhexanoate; organotitanates such as tetrabutyltitanate, tetra-n-propyltitanate, diisopropoxydi(ethoxyacetoacetyl)titanate, and bis(acetylacetonyl) diisopropyltitanate. Alternatively, thermally curable materials may be used in addition to or in place of the room-temperature curable systems.

The paintable sealant compositions described herein become tack free in generally about 0.05 to about 12 hours, desirably from about 0.1 to about 2 hours once the cure is initiated. The sealants become substantially cured, i.e., chemically crosslinked, in about 7 days, although this may vary depending upon the curing system, depth of cure, and particularly the catalyst employed. The sealants are typically completely cured at about 21 days at 25° C. and 50% relative humidity. However, in the case of extruded materials, they would be vulcanized as they come out from the extruder.

The curable silicone compositions described herein may be made to pass a "paint adhesion tape test." In accordance with this specification, the "paint adhesion tape test" is set forth as ASTM test method D3359 and is performed as follows. The sealant composition is adhered to a surface and painted. A crisscross, i.e., cross-hatches, are cut through the paint and sealant layers using a razor blade. A 0.5-inch wide by 4-inch long strip of clear Scotch® brand adhesive tape (3M Corp.) is firmly applied across the pre-cut crisscross area. The tape, which is tenaciously adhered to the painted surface, is then pulled away at a 90° angle. If the paint remains intact on the surface of the sealant it is considered to have passed the test.

Optionally, an adhesion promoter may be added to the paintable sealant. The amount of adhesion promoter may readily be determined by those of ordinary skill in the art. The amount of the adhesion promoter in the paintable sealant is generally from 0 to about 10, desirably from about 1 to about 8, preferably from about 2 to about 6, and more preferably from about 1.5 to about 3 parts by weight per 100 parts of organosilicone polymer.

The adhesion promoter, although optional, is highly preferred; the adhesion promoter provides the sealant with long-term adhesion to the substrate. Suitable classes of adhesion promoters are aminoalkyl, mercaptoalkyl, ureidoalkyl, carboxy, acrylate and isocyanurate functional silanes. Examples of suitable adhesion promoters are mercaptopropyltrimethoxysilane, glycidoxypropyltrimemethoxysilane, aminopropyltriethoxysilane, aminopropyltrimethoxysilane, aminoethylaminopropyltrimethoxysilane, ureidopropyltrimethyloxysilane, bis-γ-trimethoxysilylpropylurea, 1,3,5-tris-γ-trimethyloxysilylproplisocyanurate, bis-γ-trimethoxysilylpropylmaleate and fumarate and γ-methacryloxypropyltrimethoxysilane.

Optionally, reinforcing agents may be added to the paintable sealant compositions of the present invention. The amount of the reinforcing agent is generally from 0 to about 250, desirably from about 30 to about 200, preferably from about 20 to about 150, and more preferably from about 10 to about 100 parts by weight of polymer.

The reinforcing agents are optional, although highly preferred, particularly when the sealant is used as a caulk. Reinforcing agents increase tensile strength in the cured sealant and reduce sag of the uncured sealant. The reinforcing agent also functions as a thixotrope. Such reinforcing agents are finely divided particulates and include both the conventionally known reinforcing agents and semi-reinforcing agents, typically having a particle size less than about 10 microns, preferably about 5 microns or less, more preferably about 0.1 microns or less. Suitable reinforcing agents include hydrophobic treated fumed silicas, such as TS 720 from Cabot Corporation, or R-972 from Degussa Corporation, hydrophobic precipitated calcium carbonates, talc, zinc oxides, polyvinyl chloride powders, and soft acrylates such as those of U.S. Pat. No. 6,403,711B1, incorporated herein by reference. Other ingredients can also be utilized in the sealant formulation in amounts up to about 20 parts by weight and desirably from about 0.01 to about 15 parts by weight per 100 parts by weight of the copolymer and the organopolysiloxane. Such ingredients include fungicides. Moreover, extender fillers such as ground calcium carbonates and diatomaceous earth are optionally employed. Such extenders have minimal or no reinforcing effect and/or minimal or no thixotropic effect.

UV stabilizers may also optionally be added. Pigments or colorants such as titanium dioxide, iron oxide, carbon black are optionally employed to impart color to the sealant and/or to act as ultraviolet stabilizer. LTV inhibitors, anitozonates are also optionally added.

The sealant in its uncured state may optionally contain solvents such as organic solvents to reduce the viscosity.

EXAMPLES

Example 1

In this example, about 43% organic polymer (based on the total weight of organic and inorganic polymer) was used to prepare a medium modulus sealant with a shore-A of 15. The organic polymer comprised a silyl terminated polyurethane. The amounts are listed in Table 1 below.

TABLE 1

| Composition | Weight Percent |
|---|---|
| 2400 cps. silanol terminated dimethylpolysiloxane | 10.44 |
| 50,000 cps. silanol terminated dimethylpolysiloxane polymer | 23.43 |
| Soft acrylic filler (thixotrope) | 19.38 |
| Hydrophobic treated precipitated calcium carbonate | 5.86 |
| Hexamethyldisilazane | 0.35 |
| Hydrophobic treated ground calcium carbonate | 2.34 |
| Acrylic functional plasticizer | 7.14 |
| Dimethylbis-secondary butylaminosilane | 0.64 |
| Methyltris-methylethylketoximosilane | 3.99 |
| A trimethoxysilylalkyl terminated polyurethane | 25.56 |
| Aminoethylaminopropyltrimethoxysilane | 0.86 |
| Dibutyltindilaurate | 0.01 |
| TOTAL | 100.00 |

The above composition was painted after curing, yielding a smooth painted surface having no "fish eyes." The above composition passed the paint adhesion test, as described in the specification. This composition also maintained excellent weatherability as demonstrated with no surface cracks and no change in shore-A, even after more than 20,000 hours of UV exposure in the Xenon weatherometer.

Example 2

In this example, about 29% (by weight, based on total polymer) organic polymer was used to prepare a medium modulus sealant with a shore-A of 15. The organic polymer comprised a silyl terminated polyether polymer as shown in Table 2. This composition was designed to give a paintable fast curing silicone sealant having medium modulus properties combined with excellent adhesion properties on plastics, glass and anodized aluminum.

TABLE 2

| Composition | Weight Percent |
|---|---|
| 50,000 cps. silanol terminated dimethylpolysiloxane polymer | 25.46 |
| 20,000 cps. silanol terminated dimethylpolysiloxane polymer | 16.97 |
| Hydrophobic treated precipitated calcium carbonate | 33.94 |
| Hexamethyldisilazane | 0.85 |
| Dimethylbis-secondary butylaminosilane | 2.25 |
| Vinyitris-methylethylketoximosilane | 1.70 |
| Alkoxy silyl terminated polyether | 16.97 |
| Aminoethylaminopropyltrimethoxysilane | 1.80 |
| Dibutyltindiacetate | 0.06 |
| TOTAL | 100.00 |

The unpainted composition upon curing had a tack free of time of 15 minutes accompanied by tooling time of 9 minutes. It underwent more than 20,000 hours of weathering tests in the Xenon Arc Weatherometer without any observable surface changes taking place. The sealant had excellent paintability. Laboratory studies indicated that the sealant retained its paintability characteristics indefinitely as shown by periodic paintability tests carried over a period of 79 days. The painted composition was smooth and had no "fish eyes."

Example 3

In this example, about 24% (by weight, based on total polymer) organic polymer was used to prepare a medium modulus sealant. The organic polymer comprised a silyl terminated polyether polymer as shown in Table 3, below.

TABLE 3

| Composition | Weight Percent |
|---|---|
| 50,000 cps. silanol terminated dimethylpolysiloxane polymer | 3.83 |
| 20,000 cps. silanol terminated dimethylpolysiloxane polymer | 34.51 |
| 2400 cps. silanol terminated dimethylpolysiloxane polymer | 4.02 |
| Vinyltris-methylethylketoximosilane | 1.53 |
| Dimethylbis-secondarybutylaminosilane | 2.037 |
| Hexamethyldisilazane | 0.84 |
| Hydrophobic treated precipitated calcium carbonate | 30.68 |
| Soft acrylic filler | 7.48 |
| Alkoxy silyl terminated polyether polymer | 13.42 |
| Aminopropyltriethoxysilane | 1.63 |
| Dibutyltindiacetate | 0.023 |
| TOTAL | 100.00 |

The above composition was painted after curing, yielding a smooth painted surface having no "fish eyes." The above composition also passed the paint adhesion test while maintaining excellent weatherability as demonstrated with no surface cracks and no change in shore-A, even after more than 20,000 hours of UV exposure in the Xenon weatherometer.

Example 4

In this example, about 26% (by weight, based on total polymer) organic polymer was used to prepare a medium modulus sealant. The organic polymer comprised an MDI terminated polyurethane polymer as shown in Table 4, below.

TABLE 4

| Composition | Weight Percent |
|---|---|
| 50,000 cps. silanol terminated dimethylpolysiloxane polymer | 26.12 |
| 20,000 cps. silanol terminated dimethylpolysiloxane polymer | 17.41 |
| Vinyltris-methylethylketoximosilane | 2.394 |
| Dimethylbis-secondarybutylaminosilane | 1.22 |
| Hexamethyldisilazane | 0.871 |
| Hydrophobic treated precipitated calcium carbonate | 34.83 |
| MDI terminated polyurethane prepolymer | 15.24 |
| Aminopropyltriethoxysilane | 1.85 |
| Dibutyltindiacetate | 0.065 |
| TOTAL | 100.00 |

The above composition was painted after curing, yielding a smooth painted surface having no "fish eyes." The above composition also passed the paint adhesion test while maintaining excellent weatherability as demonstrated with no surface cracks after UV exposure of more than 20,000 hours in the Xenon Weatherometer.

Example 5

In this example, about 31% (by weight, based on total polymer) organic oligomer was used to prepare a silicone sealant. The organic oligomer comprised an oximo silane terminated polyether polyol as shown in Table 5, below. The oximo silane terminated polyether polyol was prepared by prereacting it with vinyl-methylethylketoximosilane.

TABLE 5

| Composition | Weight Percent |
|---|---|
| 50,000 cps. silanol terminated dimethylpolysiloxane polymer | 24.90 |
| 20,000 cps. silanol terminated dimethylpolysiloxane polymer | 16.60 |
| Vinyltris-methylethylketoximosilane | 2.90 |
| Oximo silane terminated polyether polyol | 17.43 |
| Dimethylbis-secondarybutylaminosilane | 2.20 |
| Hexamethyldisilazane | 0.95 |
| Hydrophobic treated precipitated calcium carbonate | 33.20 |
| Aminopropyltriethoxysilane | 1.76 |
| Dibutyltindiacetate | 0.06 |
| Total | 100.00 |

The above composition was painted after curing, yielding a smooth painted surface having no "fish eyes." The above composition also passed the paint adhesion test while maintaining excellent weatherability as demonstrated with no surface cracks and no change in shore-A, even after more than 20,000 hours of UV exposure in the Xenon weatherometer.

Example 6

In this example, about 15% (by weight, based on total polymer) organic polymer was used to prepare a paintable sealant. The sealant had a Shore-A Hardness of 40, accompanied by an elongation of 760% and tensile strength of 220 psi. The organic polymer comprised an acrylic terpolymer and polyether polyol as shown in Table 6, below.

TABLE 6

| Composition | Weight Percent |
|---|---|
| 50,000 cps. silanol terminated dimethylpolysiloxane polymer | 24.42 |
| 20,000 cps. silanol terminated dimethylpolysiloxane polymer | 16.28 |
| Hydrophobic precipitated calcium carbonate | 32.56 |
| Ground calcium carbonate | 7.79 |
| Talc | 0.90 |
| Titanium dioxide | 0.26 |
| Hexamethyldisilazane | 0.81 |
| Dimethylbis-secondarybutylaminosilane | 2.16 |
| Vinyltris-methylethylketoximosilane | 1.63 |
| Ethyl acrylate acrylonitrile acrylic acid terpolymer | 6.81 |
| Polyether polyol | 0.20 |
| Butyl benzyl phthalate | 0.77 |
| Solvent | 2.77 |
| Ceramic fiber | 0.85 |
| Aminoethylaminopropyltrimethoxysilane | 1.73 |
| Dibutyltindiacetate | 0.06 |
| Total | 100.00 |

After curing, the above sealant was painted with acrylic latex paint. The painted surface was smooth, and showed no fish eyes. Three days after painting, the surface was subjected to the paint adhesion test, described above without any paint removal taking place.

Example 7

In this example, about 9% (by weight, based on total polymer weight) organic polymer was used to prepare a paintable sealant. It had a Shore-A Hardness of 43, accompanied by an elongation of 355% and a tensile strength of 300 psi. The organic polymer comprised an isobutylene-isoprene copolymer and polybutene and a hydrocarbon resin tackifier as shown in Table 7, below.

TABLE 7

| Composition | Weight Percent |
|---|---|
| 50,000 cps. silanol terminated polydimethylsiloxane polymer | 24.42 |
| 20,000 cps. silanol terminated polydimethylsiloxane polymer | 16.28 |
| Hydrophobic precipitated calcium carbonate | 32.56 |
| Ground calcium carbonate | 11.14 |
| Titanium dioxide | 0.27 |
| Magnesium carbonate | 0.22 |
| Crystalline silica | 0.09 |
| Hexamethyldisilazane | 0.81 |
| Dimethylbis-secondarybutylaminosilane | 2.16 |
| Vinyltris-methylethylketoximosilane | 1.63 |
| Polybutene | 2.81 |
| Isobutylene isoprene copolymer | 1.14 |
| Hydrocarbon resin | 0.24 |
| Castor oil | 0.24 |
| Solvent | 2.89 |
| Aminoethylaminopropyltrimethoxysilane | 1.73 |
| Dibutyltindiacetate | 0.06 |
| Total | 100.00 |

The resulting sealant was painted and tested in the same manner as described earlier. The painted surface was smooth and had no fish eyes. The above composition also passed the paint adhesion test while maintaining excellent weatherability as demonstrated with no surface cracks and no change in shore-A.

The examples included herein are for illustration and are not meant to limit the scope of the invention.

We claim:

1. A curable silicone composition which, when cured, exhibits an elongation of at least 150% and is capable of being painted without formation of fish eyes, the composition comprising a) about 50 to 95 wt % based on total polymer of at least one reactive organopolysiloxane polymer having a weight average molecular weight of about 10,000 to 200,000;
b) about 1 to 10 wt % based on the weight of the organopolysiloxane of at least one silane functional crosslinker; and
c) about 5 to 50 wt. % based on total polymer of a semi-compatible polymer component comprising one or more of the following polymers and oligomers: a silylated polyurethane, an MDI-terminated polyurethane, a reactive silylated polyol in which the polyol is at least one of polyester, polybutadiene and polycarbonate, a non-silylated acrylic polymer, and a silylated or unsilylated butyl functional polymer selected from styrene butadiene, polybutadiene and butyl rubber.

2. The curable silicone of claim 1, wherein the organopolysiloxane polymer contains at least two reactive functional groups selected from the group consisting of hydroxyl, alkoxy, acyloxy, oximo, amino, amido, aminoxy, alkenoxy, enoxy and mixtures thereof.

3. The curable silicone of claim 2, wherein the weight average molecular weight of the organopolysiloxane polymer is about 20,000 to 100,000.

4. The curable silicone composition of claim 1, wherein the organic polymer is a silylated polyurethane polymer.

5. The curable silicone composition of claim 4, wherein the silylated polyurethane polymer is silylated with an organo functional silane having one or more hydrolyzable groups.

6. The curable silicone composition of claim 5, wherein the hydrolyzable group is selected from the group consisting of $(OCH_3)_3$, $(OCH_2CH_3)_3$, oximo, enoxy, isopropenoxy,

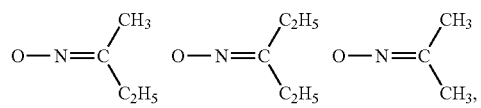

and combinations thereof.

7. The curable silicone composition of claim 5, wherein the organo functional silane is of the formula:

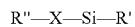

wherein
R' is selected from the group consisting of $(OCH_3)_3$, $(OCH_2CH_3)_3$, $CH_3(OCH_3)_2$, $CH_3(OCH_2CH_3)_2$, oximo, enoxy, and isopropenoxy;
R" is selected from the group consisting of amino, ureido, mercapto, isocyanato, and epoxy; and
X is $C_1$ to $C_8$.

8. The curable silicone composition of claim 5, wherein the weight average molecular weight of the polyurethane which is silylated ranges from 5,000 to 50,000 g/mol.

9. The curable silicone composition of claim 8, wherein the polyurethane which is silylated has an NCO/OH ratio in the range from 1.4:1 to 3:1.

10. The curable silicone composition of claim 1, wherein the organic polymer is an MDI-terminated polyurethane.

11. The curable silicone composition of claim 1, wherein the semi-compatible organic polymer or oligomer comprises 15 to 50 wt. %, based on total polymer of a reactive silylated polyol in which the polyol is at least one of polyester, polyacrylate, polybutadiene and polycarbonate.

12. The curable silicone composition of claim 1, wherein the semi-compatible organic polymer or oligomer comprises 10 to 50 wt. %, based on total polymer of a non-silylated acrylic polymer.

13. The curable silicone composition of claim 1, wherein the semi-compatible organic polymer or oligomer comprises 5 to 50 wt. %, based on the weight of components a) and c), of a silylated or unsilylated butyl functional polymer.

14. The curable silicone composition of claim 1, which when cured exhibits an elongation of at least 400%.

15. The curable silicone composition of claim 14, which when cured exhibits an elongation of at least 800%.

16. The curable silicone composition of claim 1, wherein the crosslinker is selected from the group consisting of oximosilanes, alkoxysilanes, epoxyalkylalkoxysilanes, amido silanes, aminosilanes, enoxysilanes, tetraethoxysilanes, methyltrimethoxysilane, vinyltrimethoxysilane, glycidoxypropyltrimethoxysilane, vinyltris-isopropenoxysilane, methyltris-isopropenoxysilane, methyltris-cyclohexylaminosilane, methyltris-secondarybutylaminosilane, and combinations thereof.

17. The curable silicone composition of claim 1, wherein the crosslinker is an oximosilane crosslinker.

18. The curable silicone composition of claim 1, further comprising from 0.01% to 2% (by total weight) catalyst.

19. The curable silicone composition of claim 18, wherein the catalyst is selected from the group consisting of metal salts of carboxylic acids, organotitanates, platinum complexes, peroxides, and combinations thereof.

20. The curable silicone composition of claim 19, wherein the catalyst comprises metal salts of carboxylic acids selected from the group consisting of dibutyltindilaurate, dibutyltindiacetate, dimethyltindi-2-ethylhexanoate, and combinations thereof.

21. The curable silicone composition of claim 19, wherein the catalyst comprises organotitanates selected from the group consisting of tetrabutyltitanate, tetra-n-propyltitanate, diisopropoxydi(ethoxyacetoacetyl)titanate, bis(acetylacetonyl)diisopropyl titanate and combinations thereof.

22. The curable silicone composition of claim 19, wherein the catalyst comprises a platinum complex.

23. The curable silicone composition of claim 19, wherein the catalyst comprises a peroxide.

24. The curable silicone composition of claim 1, further comprising from 3% to 60% (by total weight) reinforcement agents, semi-reinforcing agents, or combinations thereof.

25. The curable silicone composition of claim 24, wherein the reinforcement agent is selected from the group consisting of hydrophobic treated fumed silicas, untreated fumed silicas, hydrophobic precipitated calcium carbonates, ground calcium carbonates, talc, zinc oxides, polyvinyl chloride powders, soft acrylic polymers and combinations thereof.

26. The curable silicone composition of claim 1, further comprising from 0.5% to 2% (by total weight) adhesion promoter.

* * * * *